(12) United States Patent
Mao

(10) Patent No.: US 8,120,582 B2
(45) Date of Patent: Feb. 21, 2012

(54) COMPUTER MOUSE WITH A HAND GRIP EXERCISER

(75) Inventor: Te-Chuan Mao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 299 days.

(21) Appl. No.: 12/604,349

(22) Filed: Oct. 22, 2009

(65) Prior Publication Data

US 2011/0037697 A1  Feb. 17, 2011

(30) Foreign Application Priority Data

Aug. 17, 2009  (CN) .......................... 2009 1 0305710

(51) Int. Cl.
*G06F 3/033* (2006.01)
*G09G 5/08* (2006.01)

(52) U.S. Cl. ........................................ 345/163

(58) Field of Classification Search .......... 345/163–165; 463/37–38
See application file for complete search history.

(56) References Cited

U.S. PATENT DOCUMENTS

| 6,727,889 B2 * | 4/2004 | Shaw ............................. 345/163 |
| 7,312,789 B2 * | 12/2007 | Koike et al. .................... 345/163 |
| D619,578 S * | 7/2010 | Zhao et al. .................... D14/403 |
| 2002/0190952 A1 * | 12/2002 | Shah ............................. 345/163 |
| 2007/0188452 A1 * | 8/2007 | Chen et al. .................... 345/163 |
| 2008/0246728 A1 * | 10/2008 | Hu ................................ 345/163 |

* cited by examiner

*Primary Examiner* — Chanh Nguyen
*Assistant Examiner* — James Nokham
(74) *Attorney, Agent, or Firm* — Altis Law Group, Inc.

(57) ABSTRACT

A computer mouse includes a lower shell, an upper shell mounted to the lower shell, a resilient member, and a converting unit. The upper shell includes two rotating portions rotatably mounted to the lower shell. A resisting post extends from each rotating portion, and resists against the resilient member. The rotating portion can be slidably clamped via the converting unit, and then the rotating portions are prevented from rotating away from each other. The rotating portions can be rotated towards each other, and the elasticity of the resilient member drives the rotating portions away from each other.

12 Claims, 5 Drawing Sheets

COMPUTER MOUSE WITH A HAND GRIP EXERCISER

BACKGROUND

1. Technical Field

The disclosure relates to input devices for use in a computer system, and particularly to a computer mouse.

2. Description of Related Art

A conventional computer mouse normally includes a shell, two buttons, and an optional scroll wheel. The shell includes an upper portion and a lower portion. The buttons and the scroll wheel are disposed at a front part of the upper portion for finger pressing, and a rear part of the upper portion is in a raised shape for comfortable contact with a palm of a user.

The user typically holds the computer mouse and moves it on a supporting surface. However, the users' arm and hand will become fatigued after prolonged use of the computer mouse, which will harm the user's health.

DETAILED DESCRIPTION

Figure 1:
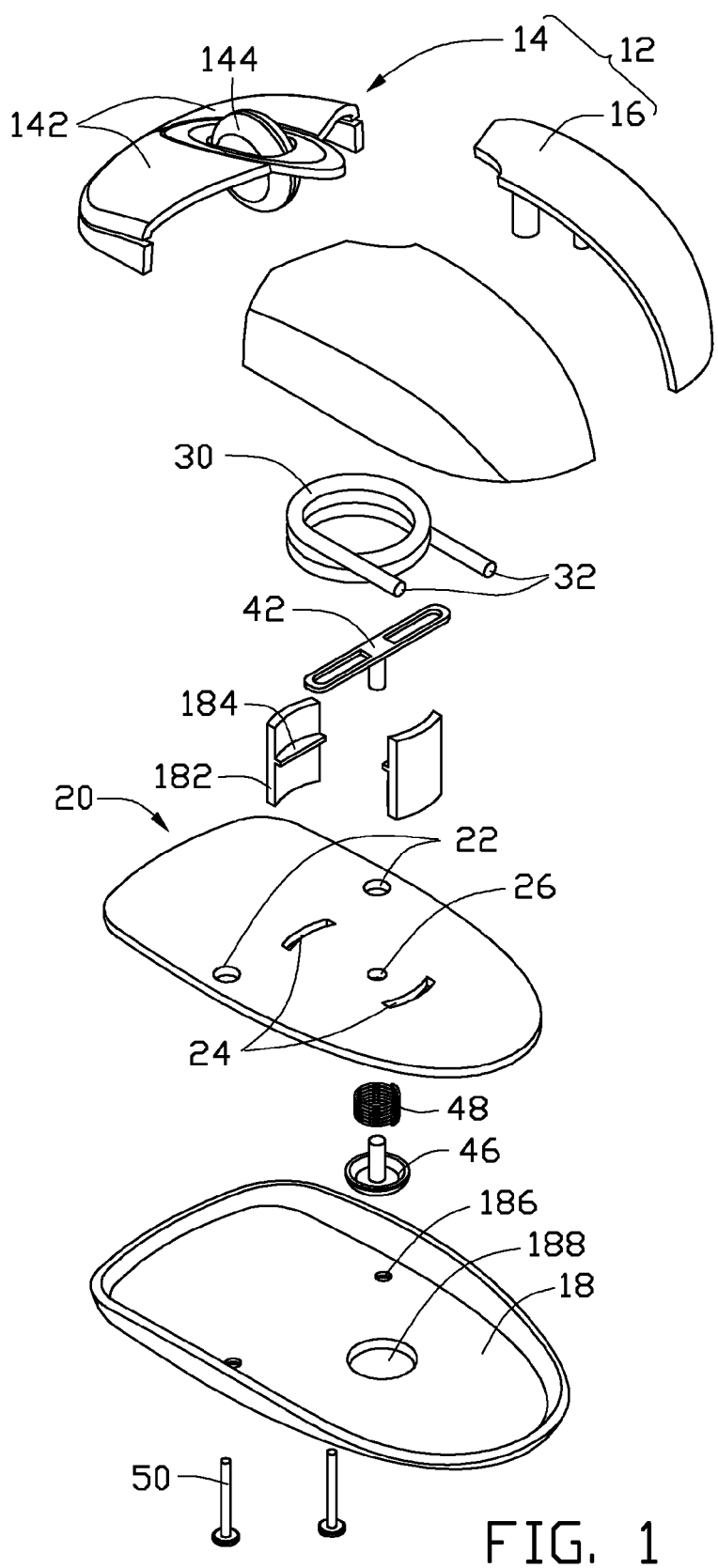
FIG. 1 is an exploded, isometric view of an exemplary embodiment of a computer mouse, the computer mouse including two positioning members and two rotating portions.
Figure 2:
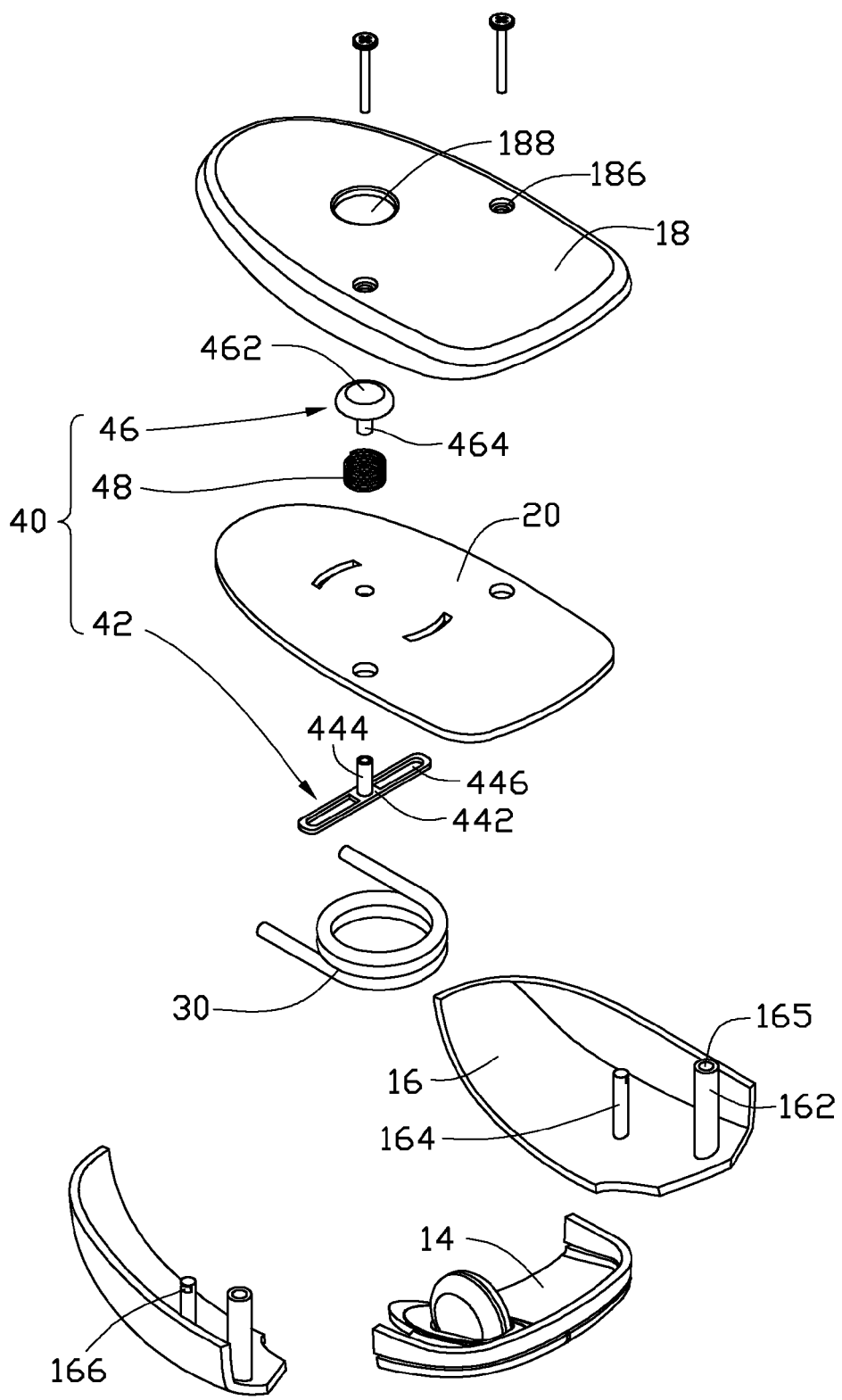
FIG. 2 is an inverted view of FIG. 1, without showing the two positioning members.

Referring to FIGS. 1 and 2, an exemplary embodiment of a computer mouse with a hand grip exercise function, includes an upper shell 12, a lower shell 18, two positioning members 182, a fixing member 20, a resilient member 30, a converting unit 40, and two fastening members 50.

The upper shell 12 includes an operating region 14, and two rotating portions 16 pivotably mounted to the lower shell 18. The operating region 14 includes two selecting buttons 142, and a scroll wheel 146 located between two selecting buttons 142 for finger pressing to operate a computer (not shown) connected to the computer mouse. Each rotating portion 16 is generally cambered shaped, with a raised outer surface, to be comfortable for users' palms. A fixing post 162 and a resisting post 164 parallel to the fixing post 162, both extend from a bottom of each rotating portion 16. A distal end of the fixing post 162 axially defines a fixing hole 165. A cutout 166 is defined in a circumference of a distal end of the resisting post 164.

The lower shell 18 defines a receiving hole 188 and two step holes 186 offset from the receiving hole 188, for rotatably receiving the fastening members 50. In this embodiment, an annular tab (not labeled) protrudes from an edge of the lower shell 18.

Each positioning member 182 has a cambered cross-section, and a resisting portion 184 extends from an intrados of each positioning member 182.

The fixing member 20 defines two pivot holes 22 for the fixing posts 162 of the upper shell 12 rotatably passing through, two fixing slots 24 for fixing the positioning members 182, and a through hole 26 located between the two fixing slots 24.

In this embodiment, the resilient member 30 is a torsion spring, and includes two fixing feet 32.

The converting unit 40 includes a latching member 42, a pressing member 46 fixed to the latching member 42, and an elastic member 48 mounted between the pressing member 46 and the latching member 42. In this embodiment, the elastic member 48 is a coil spring.

The latching member 42 includes a clamping portion 442 and a fixing portion 444 perpendicularly extending down from a middle of the clamping portion 442. The clamping portion 442 defines two fixing holes 446, situated beside opposite sides of the fixing portion 444, respectively. The fixing portion 444 axially defines a fastening hole (not labeled), for fixing the pressing member 46.

The pressing member 46 includes a great head portion 462, and a small connecting portion 464 perpendicularly extending from the head portion 462.

Figure 3:
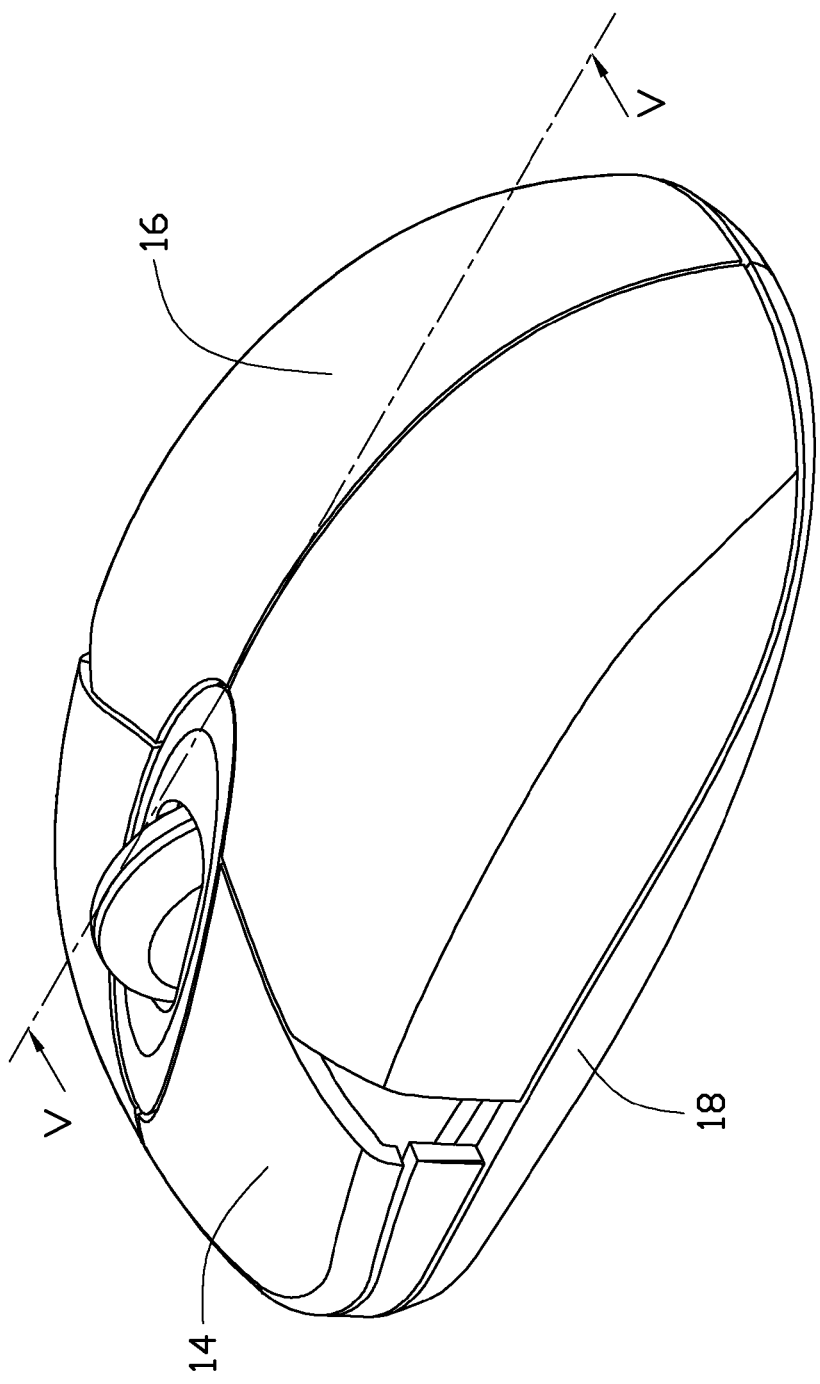
FIG. 3 is an assembled, isometric view of the computer mouse of FIG. 1.

Referring to FIG. 3, in assembly, the fixing portion 444 of the latching member 42 is slidably passed through the through hole 26 of the fixing member 20. The connecting portion 464 of the pressing member 46 is passed through the elastic member 48, and fixedly engaged in the fastening hole of the fixing portion 444. Therefore, the converting unit 40 is slidably mounted to the fixing member 20, and the head portion 462 of the pressing member 46 and the clamping portion 442 of the latching member 42 are situated at opposite sides of the fixing member 20. The positioning members 182 are frictionally passed through the fixing slots 24 of the fixing member 20, and then, fixed to the lower shell 18 by a plurality of bolts (not shown). Therefore, the fixing member 20 is situated between the lower shell 18 and the resisting portions 184 of the positioning members 182. The head portion 462 is aligned with the receiving hole 188 of the lower shell 18. Opposite ends of the elastic member 48 of the converting unit 40 resist against the fixing member 20 and the head portion 462. The fixing posts 162 of the upper shell 12 are rotatably passed through the pivot holes 22 of the fixing member 20, respectively. The fastening members 50 are passed through the step holes 186 of the lower shell 18, and then, screwed into the fixing holes 165 of the fixing posts 162, respectively. Therefore, the rotating portions 16 of the upper shell 12 are mounted to the lower shell 10, and can be rotated around the corresponding fixing posts 162. The resilient member 30 is located between the positioning members 182, and supported on the resisting portions 184 of the positioning members 182. A circumference of the resilient member 30 resists against the intradoses of the positioning members 182. The fixing feet 32 of the resilient member 30 resist against the resisting posts 164 of the corresponding rotating portions 16 of the upper shell 12. The head portion 462 of the pressing member 46 is depressed towards the fixing member 20 to deform the elastic member 48, together with the latching member 42, and therefore, the resisting posts 164 of the rotating portions 16 are pressed to be clamped in the fixing holes 446 of the latching member 42, with edges bounding the fixing holes 446 engaging in the cutouts 166 of the resisting posts 164. The operating region 14 of the upper shell 12 is fixed to a front portion of the lower shell 18, and abuts the rotating portions 16. Fully assembled, the user can operate the computer mouse to control and operate the computer.

Figure 4:
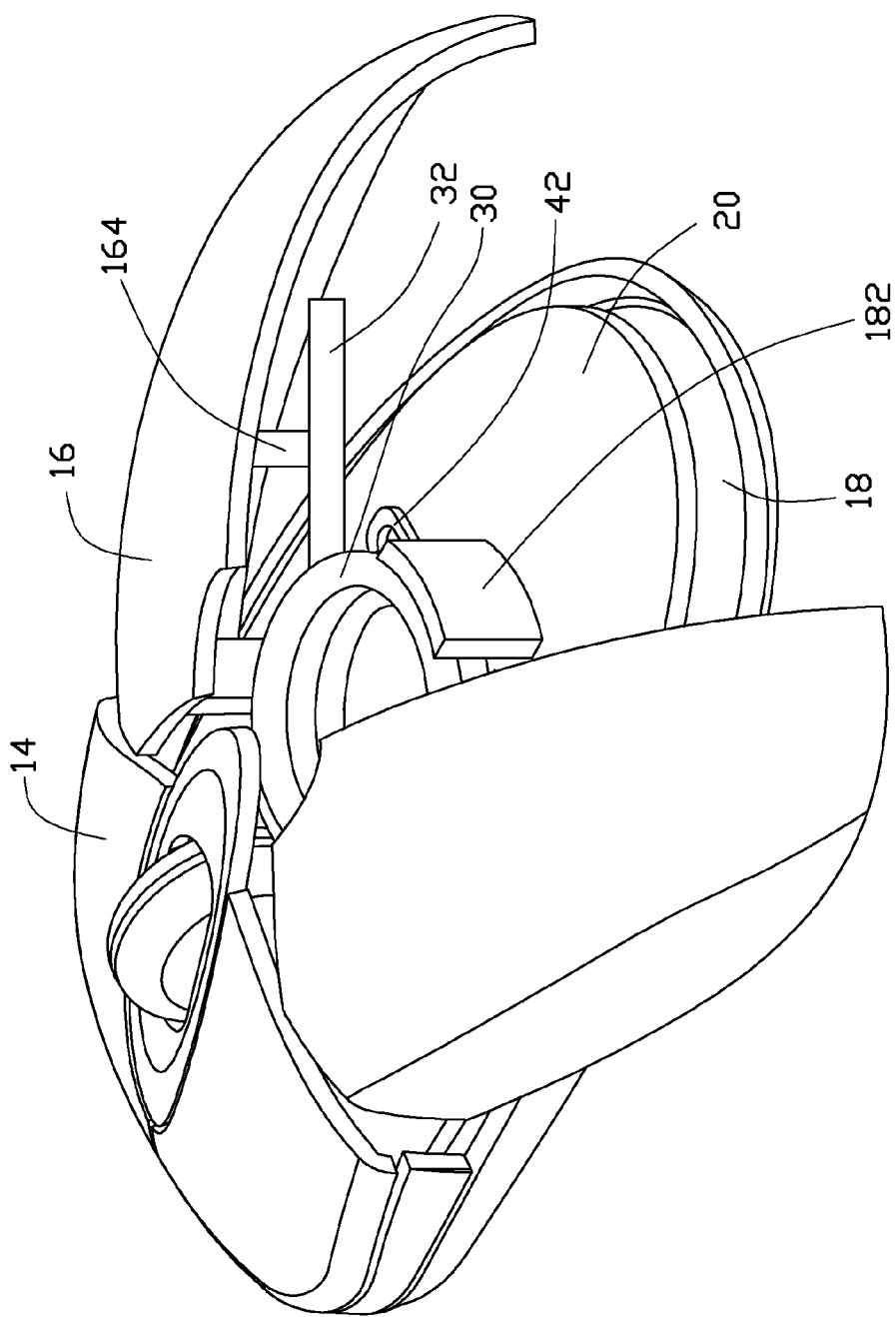
FIG. 4 is similar to FIG. 3, but showing the two rotating portions rotated away from each other.
Figure 5:
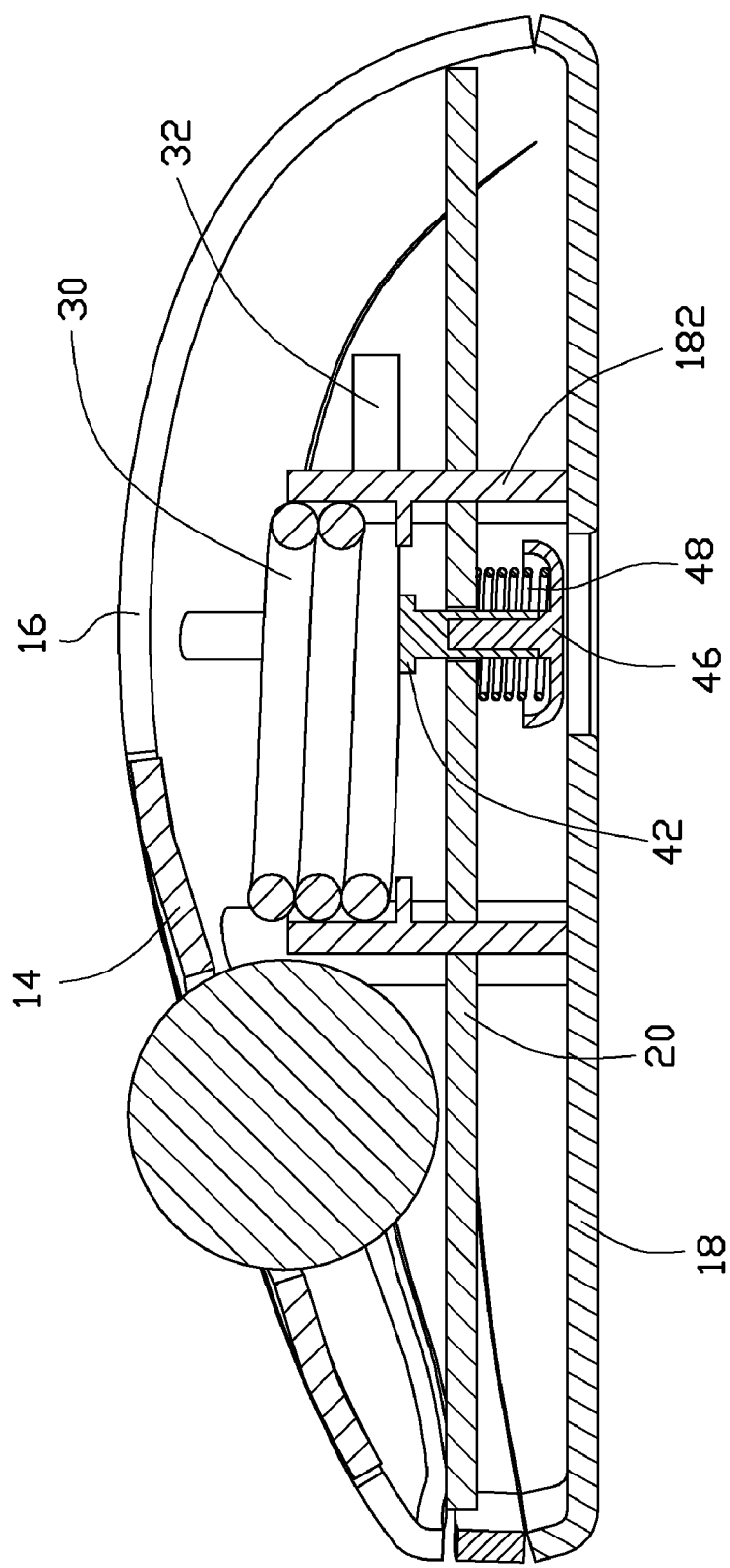
FIG. 5 is a cross-sectional view of FIG. 3, taken along the line V-V.

Referring to FIGS. 4 and 5, when the computer mouse is used as a hand grip exerciser, the rotating portions 16 of the upper shell 12 are pressed towards each other, thereby, the edges bounding the fixing holes 446 of the latching member 42 are disengaged from the cutouts 166 of the rotating portions 16. The elastic member 48 restores to move the head portion 462 of the pressing member 46 towards the lower shell 18, together with the latching member 42. Therefore, elasticity of the resilient member 30 rotates the rotating portions 16 to move away from each other. Thereafter, the two rotating portions 16 can be gripped and pressed towards each other single handedly, and then released repeatedly thus exercising a user grip.

To restore the computer mouse to mouse only functioning, the two rotating portions 16 of the upper shell 12 are squeezed together, then the head portion 462 is depressed. Thereby, the resisting posts 164 of the rotating portions 16 are closed to each other distorting the resilient member 30, the elastic member 48 of the converting unit 40 is deformed, and the latching member 42 of the converting unit 40 is pushed to move away from the fixing member 20. As a result, the resisting posts 164 are passed through the two fixing holes 446 of the latching member 42, respectively. Thereafter, the two rotating portions 16 are released, elasticity of the resilient member 30 moves the resisting posts 164 away from each other, thereby, the edges bounding the fixing holes 446 are clamped in the cutouts 166 of the resisting posts 164, respectively. Therefore, the rotating portions 16 can be no longer rotated.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A computer mouse comprising:
   a lower shell;
   an upper shell comprising two rotating portions rotatably mounted to the lower shell, a resisting post extending from each rotating portion, wherein the rotating portions are rotatable towards each other;
   a resilient member resisting against the resisting posts of the two rotating portions, and the elasticity of the resilient member driving the rotating portions to rotate away from each other; and
   a converting unit slidably configured to retain the resisting posts of the rotating portions, to prevent the rotating portions from rotating away from each other.

2. The computer mouse of claim 1, further comprising two positioning members, wherein the positioning members are fixed to the lower shell, and opposite to each other, the resilient member are located between the positioning members, and a circumference of the resilient member resists against the positioning members.

3. The computer mouse of claim 2, wherein the resilient member comprises two fixing feet, each fixing foot resists against a corresponding resisting post.

4. The computer mouse of claim 1, further comprising a fixing member defining two pivot holes, wherein a fixing post extends from each rotating portion, parallel to the corresponding resisting post, each fixing post axially defines a fixing hole, the lower shell defines two step holes, the fixing posts are rotatably passed through the corresponding pivot holes, two fastening members are rotatably passed through the step holes, and then fixedly inserted into the fixing holes, respectively.

5. The computer mouse of claim 4, further comprising two positioning members, wherein the fixing member defines two opposite fixing slots, the positioning members are passed through and clamped in the fixing slots, respectively.

6. The computer mouse of claim 5, wherein the positioning members are fixed to the lower shell, a resisting portion extends from each positioning member, the resilient member is located on the resisting portions, the fixing member is situated between the resisting portions and the lower shell.

7. The computer mouse of claim 5, wherein each positioning member has a cambered cross-section, the resilient member are located between the positioning members, and a circumference of the resilient member resists against intradoses of the positioning members.

8. The computer mouse of claim 7, wherein the resilient member comprises two fixing feet, each fixing foot resists against the corresponding resisting post.

9. The computer mouse of claim 4, wherein the converting unit comprises a latching member, the latching member comprises a clamping portion defining two fixing holes situated in opposite ends of the clamping portion, each resisting post defines a cutout in a circumference of each resisting post, an edge bounding each fixing hole is operable to be clamped in the corresponding cutout.

10. The computer mouse of claim 9, wherein the converting unit further comprises a pressing member, the latching member further comprises a fixing portion perpendicularly extending from the clamping portion, the fixing member defines a through hole, the fixing portion is slidably passed through the through hole, and fixed to the pressing member.

11. The computer mouse of claim 10, wherein the converting unit still further comprises an elastic member, the pressing member comprises a head portion, and a connecting portion extending from the head portion and fixed to a distal end of the fixing portion of the latching member, the elastic member is fitted about the connecting portion, opposite ends of the elastic member resist against the fixing member and the head portion.

12. The computer mouse of claim 10, wherein the lower shell defines a receiving hole aligned with the head portion of the pressing member, for depressing the head portion.

* * * * *